June 15, 1954  E. A. JOHNSON  2,681,197
PIPE SUPPORT
Filed Aug. 22, 1950
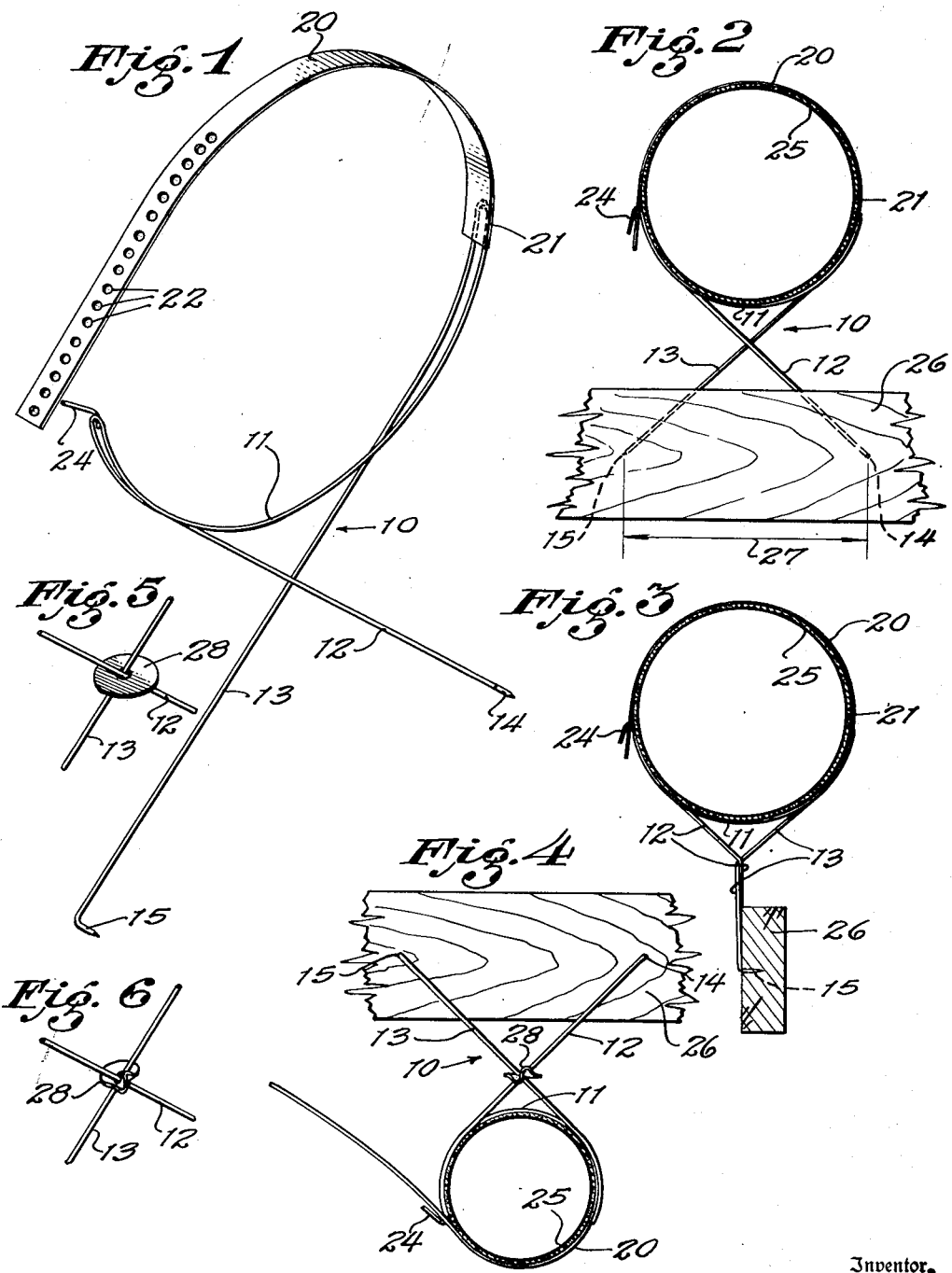
Inventor,
ELMER A. JOHNSON
BY Robert M. McManigal
Attorney Patented June 15, 1954

2,681,197

UNITED STATES PATENT OFFICE 2,681,197

PIPE SUPPORT

Elmer A. Johnson, El Monte, Calif.

Application August 22, 1950, Serial No. 180,879

1 Claim. (Cl. 248—71)

My invention relates to a support for heating and ventilating pipes.

Heating and ventilating pipes have heretofore been supported on blocks of wood and fastened with light gauge wire. The wire when secured to the wood joist frequently distorts the light gauge pipe, thereby decreasing the pipe capacity and damages the insulating material. Furthermore, heating pipes in contact with wood supports create a fire hazard.

An object of my invention is to provide a pipe support which can be used without damaging or distorting light gauge pipe or insulating material, or creating a fire hazard.

Another object of my invention is to provide a pipe support which can be used to support a pipe either above or below a supporting member.

Another object of my invention is to provide a pipe support which is capable of adjustment to accommodate a large number of different size pipes.

Another object of my invention is to provide a pipe support which is easy and economical to construct and easy, quick and convenient to use.

Another object of my invention is to provide a pipe support which is adapted to rigidly secure a pipe in position.

My invention has many other objects, advantages and features, some of which, with the foregoing, will be set forth in the following description where I shall outline two forms of my invention, which I have selected for illustration in the drawing accompanying and forming part of the present specification.

Referring to the drawing:

Fig. 1 is a perspective view of a pipe support embodying my invention;

Fig. 2 is a side elevation of the pipe support of my invention showing a heating pipe being supported above and perpendicular to a beam;

Fig. 3 is a side elevation of the pipe support of my invention showing a heating pipe being supported above and parallel to a beam;

Fig. 4 is a side elevation of a modified form of my invention showing a heating pipe being supported below and perpendicular to a beam;

Fig. 5 is a perspective view of the crossed legs of the pipe support shown in Fig. 4 showing the tie in place before the tie is deformed; and Fig. 6 is a view similar to Fig. 5 showing the tie deformed.

The pipe support of my invention may be made from a length of relatively heavy wire 10, a metal strap 20 and a short piece of wire 24.

The wire 10 is formed to provide a saddle or intermediate loop portion 11 for the support of metal pipes of light gauge. The ends of the loop portion 11 are bent back upon themselves, that is, approximately 180 degrees, and cross each other to provide a pair of relatively movable legs 12 and 13. The ends of the legs are bent laterally approximately at right angles and pointed 14 and 15, so that they can be driven into wood members.

One end 21 of the thin metal strap 20 is welded or otherwise secured to one end of the loop portion 11 and the other portion of the strap is provided with holes 22. The short piece of wire 24 is secured to the other end of the loop portion 11.

Referring to Fig. 2, a heating or ventilating pipe 25 is adapted to be positioned in the loop portion 11 above the joist or beam 26. The height of the pipe 25 with respect to the joist 26 can be raised or lowered as desired by changing the distance 27 between the pointed ends 14 and 15. In order to raise the position of the pipe with respect to the joist 26, the distance between the pointed ends 14 and 15 is decreased, and in order to lower the position of the pipe with respect to said joist, the distance between the pointed ends 14 and 15 is increased.

After the ends 14 and 15 are driven into the joist, the pipe 25 is positioned in the saddle 11, the metal strap 20 is looped around the pipe 25, and the pipe is secured in position by inserting the wire 24 through an appropriate hole 22 and then bending the wire downwardly.

As shown in Fig. 3, the pipe support can be used to support a pipe perpendicular to the wood joist 26. Obviously the pipe support can be used to support a pipe either above or below the wood joist and at an angle to the wood joist.

In the modification of my invention shown in Figs. 4, 5 and 6, means are provided to lock the legs 12 and 13 in position with respect to each other and to increase the structural strength of the pipe support. This form of my invention is identical to the form of my invention shown in Figs. 1, 2 and 3, the only difference being that the movable legs 12 and 13 are inserted through a tie 28, before the ends of the legs are bent laterally approximately at right angles.

This form of my invention is used in a manner similar to the form shown in Figs. 2 and 3. After the ends 14 and 15 are driven into the joist 26, the pipe 25 is positioned in the saddle 11, the metal strap 20 is looped around the pipe 25 and the pipe 25 is secured in position by inserting the wire 24 through an appropriate hole 22, and then bent upwardly. The tie 28 is then deformed as shown in Figs. 4 and 6 to lock the legs 12 and 13 in position with respect to each other and to increase the structural strength of the pipe support.

It will readily be seen that the pipe support can be used to support pipes of different diameters.

From the foregoing description taken in connection with the foregoing drawings, the uses, advantages, and operation of my invention will be readily understood by those skilled in the art to which the invention appertains. While I have described two embodiments of my invention, I desire to have it understood that the forms shown are merely illustrative and that the invention is not to be limited to the details disclosed herein, but is to be accorded the full scope of the appended claim.

I claim:

A pipe support comprising a length of wire having a semi-circular saddle midway between the ends thereof, the remaining portion of said wire at each side of said saddle being bent back upon the adjacent side of said saddle so as to extend substantially tangentially to and rearwardly of said semi-circular saddle to serve as supporting legs therefor, the outer end of each remaining portion being bent and pointed to engage a supporting structure, a strap having one end thereof secured to one side of said saddle and the other end detachably connected to the opposite side of said saddle to retain a pipe in said saddle.

References Cited in the file of this patent

UNITED STATES PATENTS

| Number | Name | Date |
|---|---|---|
| 396,677 | Zimmerman | Jan. 22, 1889 |
| 1,160,047 | Conner | Nov. 9, 1915 |
| 1,332,796 | Brewer | Mar. 2, 1920 |
| 1,476,764 | Morhoff et al. | Dec. 11, 1923 |
| 1,514,455 | Gordon | Nov. 4, 1924 |
| 2,286,562 | Merryweather | June 16, 1942 |
| 2,319,832 | Trochim | May 25, 1943 |
| 2,423,455 | Larson | July 8, 1947 |